No. 642,501. Patented Jan. 30, 1900.
J. A. SNYDER.
BALL BEARING.
(Application filed Sept. 28, 1899.)
(No Model.)
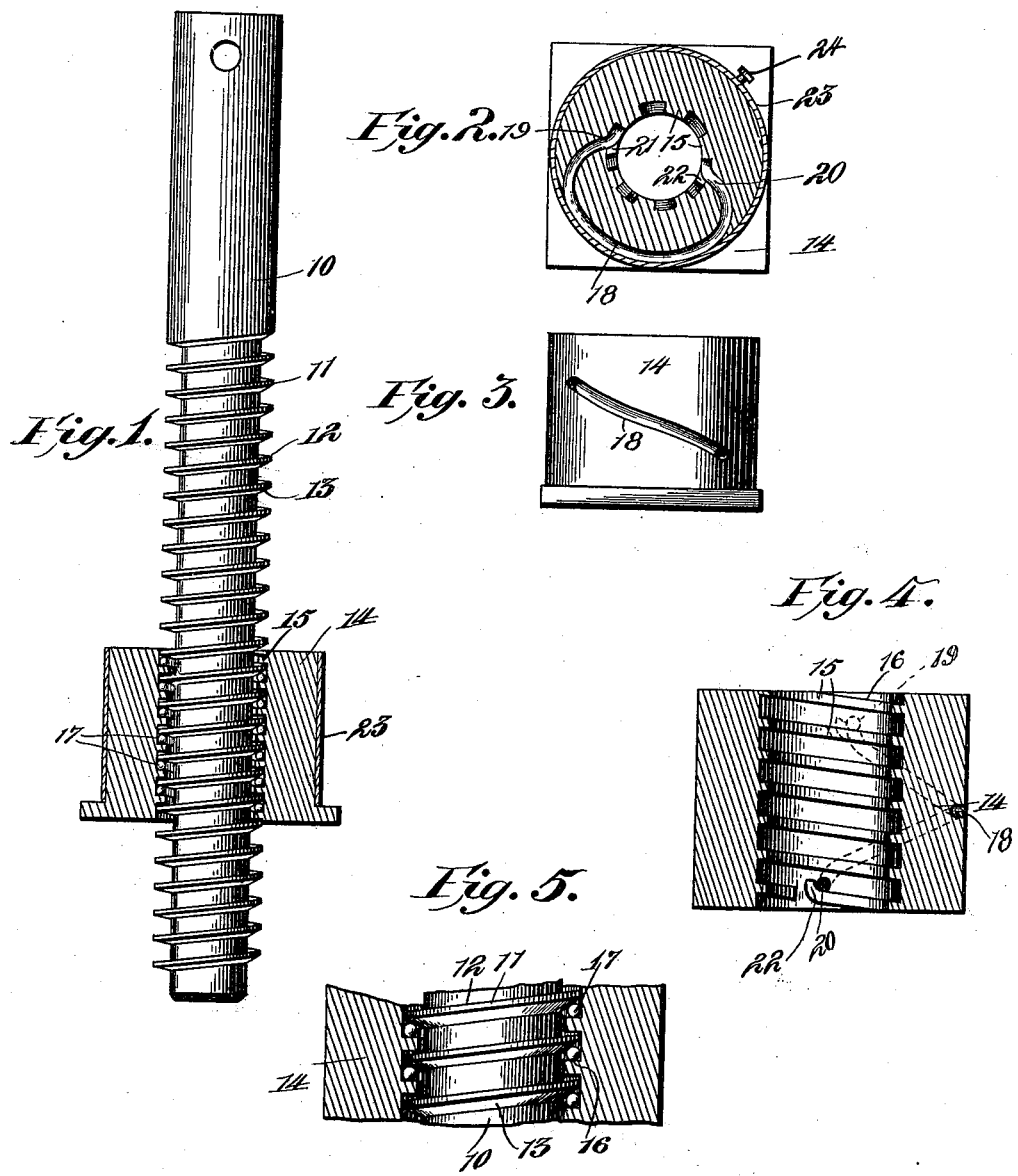

UNITED STATES PATENT OFFICE.

JOHN A. SNYDER, OF LEIPSIC, OHIO.

BALL-BEARING.

SPECIFICATION forming part of Letters Patent No. 642,501, dated January 30, 1900.

Application filed September 28, 1899. Serial No. 731,924. (No model.)

*To all whom it may concern:*

Be it known that I, JOHN A. SNYDER, a citizen of the United States, residing at Leipsic, in the county of Putnam and State of Ohio, have invented a new and useful Ball-Bearing, of which the following is a specification.

My invention relates to improvements in ball-bearings for a nut-and-screw power mechanism available for use in different arts—such as in power-brakes for rolling-stock, jacks, and other structures—wherein it is desirable to employ a screw-power mechanism.

The object of this invention is to provide an improved construction by which the friction between the intermeshing threads of a screw-spindle and a nut is minimized by the employment of bearing-balls, to prevent said balls from jamming in the races provided by the intermeshing threads and by the ball-returning conduit, to positively direct the balls in the return-conduit irrespective of the direction of rotation of the revoluble element, and to facilitate the travel of the balls from one end of the conduit to the other, the latter advantage being particularly desirable when the revoluble element is turned in a direction which will cause the balls to travel in an upward direction through the return-conduit.

With these ends in view the invention consists in the construction and arrangement of parts, which will be hereinafter fully described and claimed.

In the drawings, Figure 1 is a sectional elevation through a screw-power mechanism having ball-bearings applied thereto in accordance with my invention. Fig. 2 is a sectional view taken transversely through the nut in an irregular plane, representing the ball-returning conduit. Fig. 3 is a side elevation of the nut with the conduit-plate removed, showing the inclined length of the returning-conduit. Fig. 4 is an enlarged view of the nut, illustrating the ball stops or abutments at the opposite inturned ends of the return-conduit. Fig. 5 is an enlarged detail view of a series of intermeshing threads on the screw and the nut, illustrating the peculiar formation of the threads and the relation of the bearing-balls thereto.

The same numerals of reference are used to indicate like and corresponding parts in each of the several figures of the drawings.

The spindle 10 of the screw-power mechanism is formed with a continuous male thread 11, each convolution of which has a face 12 in a plane at right angles to the axis of the spindle, so that the face may be said to be square with the spindle; but the other face of the thread is inclined at an angle to the axial plane of the spindle, as at 13. The nut 14 is constructed with a female thread 15 in the spindle-receiving opening thereof, and both faces of this female thread are at right angles to the imaginary axis of the nut, and thus the faces 16 of the female thread may be said to be square with the nut. As is usual in the art, the male threads of the spindle and the female threads of the nut have intermeshing engagement, which, however, should be sufficiently slack or loose to accommodate the plurality of small-diameter bearing-balls which are employed according to my invention. Either the nut or the screw may be rotated by hand or power, because in some mechanisms the screw constitutes the revoluble element, while in other mechanisms the nut is the rotary element. It is therefore to be understood that a power mechanism embodying the ball-bearing of my invention may have the nut or the screw adapted to rotate around or within the other element.

The bearing-balls 17 are of small diameter, so as to fill the spaces between the intermeshing threads of the spindle and the nut provided by the slack due to loose fitting of the parts, and these bearing-balls are adapted to travel on the square face of the female thread 15 and the beveled face 13 of the male thread on the spindle, as clearly shown by Fig. 5.

The rotation of the spindle within the nut, or, vice versa, the rotation of the nut on the spindle, exerts friction on the bearing-balls in a manner to cause them to travel along the faces of the intermeshing threads, and it is therefore desirable to construct the nut with a view to insuring the circulation of the bearing-balls from one end of the nut to the other. This end is attained by the provision of a return-conduit in the nut, and one important feature of my invention consists in having a length or section of this return-conduit inclined to the imaginary axis of the nut. The inclined length of the return-conduit is indicated at 18 in the form of a channel or groove produced in the exposed face of the nut, and the end portions of this conduit are extended inwardly through the nut, as at 18 19, one end, 19, of the conduit opening into the spindle-cavity of the nut between two convolutions of the female thread therein and contiguous to the squared upper face 16 of a section of the female thread therein. The other inwardly-turned end 20 of the conduit opens into the spindle-cavity of the nut near the lower end thereof, so as to lie between two convolutions of the female thread and adjacent to the squared upper face of one thread-convolution. The open terminals of the inwardly-turned ends forming parts of the return-conduit are thus disposed in planes for the bearing-balls to pass from or into the return-conduit in order that they may make the circuit of the female thread between the openings. To positively insure the entrance of the bearing-balls into the turned ends of the conduit when the revoluble element is turning in either direction, I employ the ball stops or abutments 21 22, which project into the path of the bearing-balls as they travel on one face of the female thread and are disposed contiguous to the openings at the ends of the conduit. These stops or abutments may be integral with the nut by offsetting or deflecting a fragment of the female thread 15 at a point contiguous to the opposite ends of the return-conduit, as shown by Fig. 4 of the drawings; but the particular way in which the ball-abutments are produced in the nut is not material, because they may be fastened in place in the nut in proper relation to the ends of the conduit.

To confine the bearing-balls in the inclined length of the conduit which is formed in the exposed face of the nut, I employ the cover-plate 23, which is fashioned to fit snugly to the surface of the nut over the exposed conduit, said plate being made fast with the nut by screws 24 or other suitable fastening. It is evident that the plate may be removed for the purpose of taking off any injured or worn balls and replacing the same with fresh balls.

When the nut or the spindle is rotated in one direction, the bearing-balls are caused to travel between the squared and beveled edges of the intermeshing male and female threads on the nut and spindle, so that the upper stop 21 will direct the bearing-balls into the inturned end 19, from whence the balls travel in a downward direction through the inclined length 18 of the conduit, thence through the end 20, and, finally, back to the place between the threads at the lower part of the nut. The rotation of the nut or the spindle in an opposite direction, however, reverses the course of the bearing-balls through the return-conduit, so that the stop or abutment 22 is brought into service for directing the bearing-balls into the inturned end 20, thence into the inclined section 18 of the conduit, and, finally, to the end 19 back to the threads. When the bearing-balls circulate to pursue the course in the direction last described, they travel upwardly through the inclined section 18 of the conduit, and under these conditions the inclination of this section 18 of the conduit is advantageous, because the bearing-balls will travel more readily in an inclined path than in a perpendicular path. The construction of the nut is such as to facilitate the entrance of the bearing-balls to the return-conduit and to promote the circulation of said balls to said conduit under the conditions of service of the screw-power mechanism. The parts are quite simple and durable in construction and they operate in a manner to minimize the friction between the intermeshing threads.

Having thus described the invention, what I claim is—

In a power-transmitting device, the combination of a screw-nut provided with female threads having inwardly-turned ends, said nut being provided with an inclined return-conduit connecting the inwardly-turned ends of the female threads and communicating with the space between the threads, the screw-spindle provided with male threads having one inclined face, and the bearing-balls interposed between the inclined face of the male threads and the female threads and retained in place by the former, said balls being adapted to pass through the return-conduit and being directed into the same by the inwardly-turned ends of the female threads, substantially as described.

In testimony that I claim the foregoing as my own I have hereto affixed my signature in the presence of two witnesses.

JOHN A. SNYDER.

Witnesses:
   H. I. BERNBORD,
   M. PERRY HAHN.